(12) United States Patent
Page et al.

(10) Patent No.: US 10,518,198 B2
(45) Date of Patent: Dec. 31, 2019

(54) FILTER ENDPLATE HAVING VARIABLE HARDNESS

(71) Applicant: Cummins Filtration Sarl, Quimper (FR)

(72) Inventors: Emmanuel Page, Tremeoc (FR); Jean-Yves Picard, Quimper (FR)

(73) Assignee: Cummins Filtration Sarl, Quimper (FR)

( * ) Notice: Subject to any disclaimer, the term of this patent is extended or adjusted under 35 U.S.C. 154(b) by 0 days.

(21) Appl. No.: 16/010,738

(22) Filed: Jun. 18, 2018

(65) Prior Publication Data

US 2018/0296949 A1 Oct. 18, 2018

Related U.S. Application Data

(62) Division of application No. 15/009,977, filed on Jan. 29, 2016, now Pat. No. 10,022,655.

(30) Foreign Application Priority Data

Feb. 6, 2015 (FR) ...................... 15 50934

(51) Int. Cl.
*B01D 29/13* (2006.01)
*B01D 29/21* (2006.01)
*B01D 35/30* (2006.01)
*B01D 29/11* (2006.01)

(52) U.S. Cl.
CPC ............. *B01D 29/13* (2013.01); *B01D 29/11* (2013.01); *B01D 29/111* (2013.01); *B01D 29/21* (2013.01); *B01D 35/30* (2013.01); *B01D 2201/293* (2013.01); *B01D 2201/347* (2013.01)

(58) Field of Classification Search
CPC ...... B01D 29/13; B01D 29/21; B01D 29/111; B01D 35/30; B01D 29/11; B01D 2201/347; B01D 2201/293
USPC ............................................... 210/450, 493.2
See application file for complete search history.

(56) References Cited

U.S. PATENT DOCUMENTS 10,022,655 B2 * 7/2018 Page ..................... B01D 29/111
2012/0012513 A1 1/2012 Jokschas et al.

FOREIGN PATENT DOCUMENTS

| DE | 19838401 | 4/1999 |
|---|---|---|
| WO | WO-2009/027657 | 3/2009 |
| WO | WO-2014/078796 | 5/2014 |

OTHER PUBLICATIONS

Search report issued by French patent office for French Patent Application No. 1550934, dated Nov. 25, 2015, 6 pages.

* cited by examiner

*Primary Examiner* — Madeline Gonzalez
(74) *Attorney, Agent, or Firm* — Foley & Lardner LLP

(57) ABSTRACT

A filter cartridge having an endplate formed of polyurethane having a varying hardness is described. A first portion of the endplate is harder than a second portion of the endplate. The first portion of the endplate helps support the filter media of the filter element and maintain the shape of the filter element. The second, softer portion creates a seal between the filter element and a filter housing when the filter element is installed in the filter housing. The first portion and separate portions may be formed from different types of polyurethane or from the same type of polyurethane having a varying composition as a function of the radial distance of the endplate.

20 Claims, 3 Drawing Sheets

FILTER ENDPLATE HAVING VARIABLE HARDNESS

CROSS REFERENCE TO RELATED APPLICATIONS

The present application is a divisional of U.S. patent application Ser. No. 15/009,977, filed Jan. 29, 2016, which claims the benefit of and priority to French Patent Application No. 1550934, filed Feb. 6, 2015. The contents of both applications are incorporated herein by reference in their entirety.

TECHNICAL FIELD

The present application relates to filtration systems having filter elements with filter media and at least one endplate.

BACKGROUND

Internal combustion engines generally combust a mixture of fuel (e.g., gasoline, diesel, natural gas, etc.) and air. Lubrication oil is also supplied to the engine to lubricate the various moving components of the engine. Prior to entering the engine, the intake air, fuel, lubrication oil, and other fluids are typically passed through filtration systems to remove contaminants from the fluids (e.g., dust, water, oil, etc.) from the fluids. The filter elements require periodic replacement, as the filter media of the filter elements captures and removes contaminants from the fluids passing through the filter media. Some filter elements are cylindrical in shape. The cylindrical filter elements often include a filter media having a top endcap and a bottom endcap. The endcaps are substantially rigid to support the filter media and to maintain the shape of the filter element. The endcaps also serve to seal the clean side of the filter media from the dirty side of the filter media. To form a proper seal with a filtration housing, the endcaps are often fitted with separate sealing elements.

SUMMARY

One embodiment relates to a filter cartridge. The filter cartridge includes a filter media, a first endplate, and a second endplate. The first endplate is secured to the filter media and seals a clean side of the filter media from a dirty side of the filter media. The second endplate is secured to the filter media and seals the clean side of the filter media from the dirty side of the filter media. The second endplate includes a hard section and a compressible section. The hard section has a first hardness, and the compressible section has a second hardness. The first hardness is greater than the second hardness. The compressible section is configured to provide a sealing surface between the second endplate and a component of a filtration system when the filter cartridge is installed in the filtration system.

Another embodiment relates to a method of manufacturing an endcap of a filter cartridge. The method includes creating a mold for the endcap. The mold includes a first section and a second section. The method further includes injecting polyurethane into the first section and the second section of the mold to form the endcap. The polyurethane injected into the first section has a first hardness when cured. The polyurethane injected into the second section has a second hardness when cured. The first hardness is greater than the second hardness.

These and other features, together with the organization and manner of operation thereof, will become apparent from the following detailed description when taken in conjunction with the accompanying drawings.

DETAILED DESCRIPTION

Referring to the figures generally, the various embodiments disclosed herein relate to a filter cartridge having an endplate formed of polyurethane having a varying hardness. A first portion of the endplate is harder than a second portion of the endplate. The first portion of the endplate helps support the filter media of the filter element and maintain the shape of the filter element. The second, softer portion of the endplate creates a seal between the filter element and a filter housing when the filter element is installed in the filter housing. The first portion and the second portion may be formed from different types of polyurethane or from the same type of polyurethane having a varying composition as a function of the radial distance of the endplate. The softer, compressible portion eliminates the need for a separate seal member to be affixed to the endplate.

Figure 1:
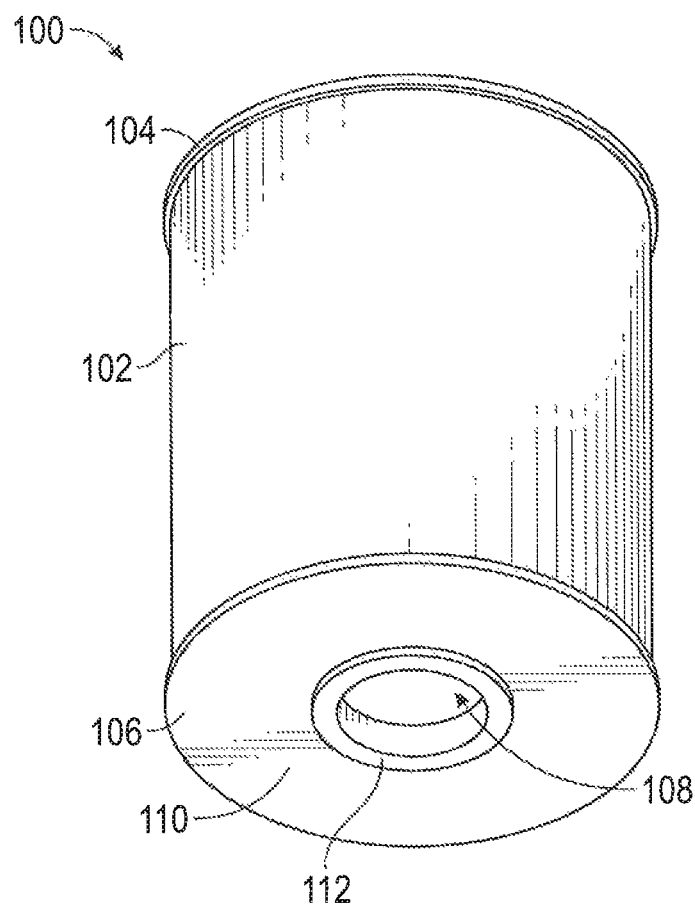
FIG. 1 is a perspective view of a filter cartridge according to an exemplary embodiment.

Referring to FIG. 1, a perspective view of a filter cartridge 100 is shown according to an exemplary embodiment. The filter cartridge 100 is a cylindrical filter element. The filter cartridge 100 may be a fuel filter element, an oil filter element, a hydraulic filter element, an air filter element, a water filter element or the like. The filter cartridge 100 includes a filter media 102. The filter media 102 may be a paper filter media, a foam filter media, a fibrous filter media, or the like. The filter media 102 is supported by a first endplate 104 and a second endplate 106. The first and second endplates 104 and 106 are secured to the filter media 102 to help support the filter media 102 and to maintain the overall shape of the filter cartridge 100. In some arrangements, the first and second endplates 104 and 106 are over molded to the filter media 102. In other arrangements, the first and second endplates 104 and 106 are secured to the filter media 102 with an adhesive. The first and second endplates 104 and 106 are made of a polyurethane material.

The first and second endplates 104 and 106 seal a clean side of the filter element from the dirty side of the filter element. The second endplate 106 includes a central opening 108. The central opening 108 allows fluid to be filtered to enter the center of the filter cartridge 100 (e.g., in an inside-out fluid flow arrangement) or filtered fluid to leave the center of the filter cartridge 100 (e.g., in an outside-in fluid flow arrangement). As described in further detail below, the second endplate 106 includes a first section 110 and a second section 112 having different characteristics.

The first section 110 is an outer portion of the second endplate 106. The second portion 112 is an inner portion of the second endplate 106 and is adjacent to the central opening.

Figure 2:
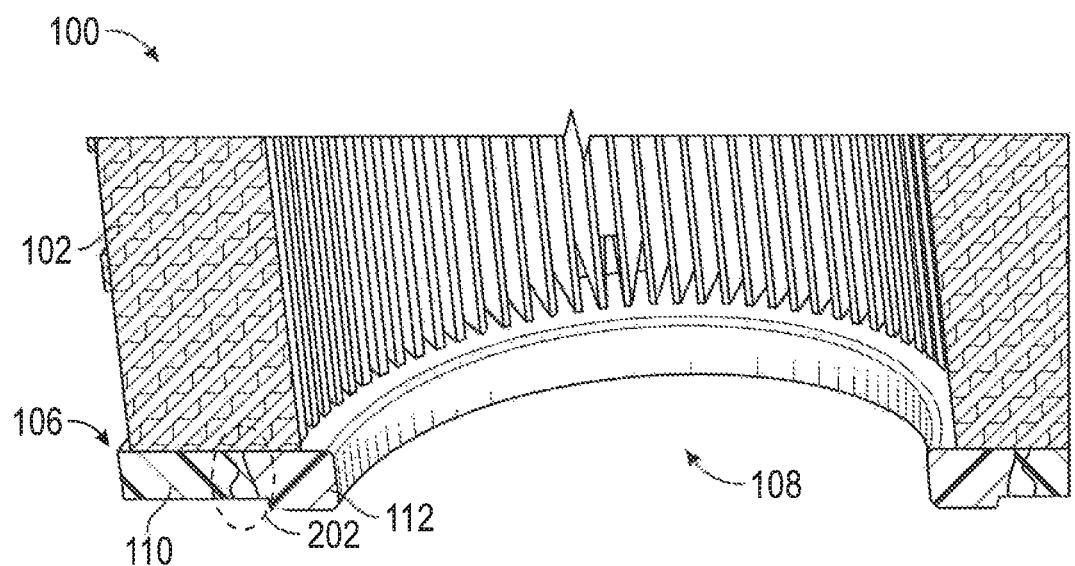
FIG. 2 is a cross-sectional view of the area of the filter element of FIG. 1 near the second endplate.

Referring to FIG. 2, a cross-sectional view of the area of the filter element 100 near the second endplate 106 is shown according to an exemplary embodiment. As shown, the second endplate 106 includes a first section 110 and a second section 112. Both the first section 110 and the second section 112 seal the clean side of the filter media 102 from the dirty side of the filter media 102. The first section 110 is comprised of a first material, and the second section 112 is comprised of a second material. The first material is harder than the second material. The resulting second endplate 106 has the first section 110, which is a hard section, and the second section 112, which is a compressible section. In some arrangements, the first material is a first polyurethane and the second material is a second polyurethane. In further arrangements, the second polyurethane is a foamed polyurethane.

The first section 110 provides a rigid and hard support that secures the filter media 102 and maintains the shape of the filter element 100 (e.g., in a cylindrical shape). Additionally, the first section 110 provides mechanical resistance that ensures proper installation of the filter element 100 into a filtration system (e.g., provides a hard support surface for a retaining clip to latch onto). The second section 112 is less rigid and compressible. The second section 112 supports and secures the filter media 102. The second section 112 also provides a sealing surface between the second endplate 106 and a component of a filter housing or filtration system (e.g., a surface, a standpipe, a central tube, etc.) when the filter element 100 is positioned in an installed position within the filter housing. For example, when the filter element 100 is inserted into the filter housing, the second section 112 compresses against a surface of the component thereby forming a seal between the second endplate 106 and the surface of the component. The use of a second softer and compressible material for the second section 112 eliminates the need for an additional seal member positioned on the second endplate 106.

The second endplate 106 may be manufactured through a molding process. In the molding process, the first material (e.g., the first polyurethane) is poured or injected into a first portion of a mold for the second endplate 106 while the first material is in a liquid form. The first portion of the mold corresponds to the first section 110 of the second endplate 106. The second material (e.g., the second polyurethane) is poured or injected into second portion of the mold while the second material is in a liquid form. The second portion of the mold corresponds to the second section 112 of the second endplate 106. The second material is overmolded onto a portion of the first material at an overmold section 202. The overmold section 202 may be a tab formed by the first material. In some arrangements, the filter media 102 is pressed into the mold while the first material and the second material are in liquid form to seal the clean side of the filter media 102 from the dirty side of the filter media 102.

Figure 3:
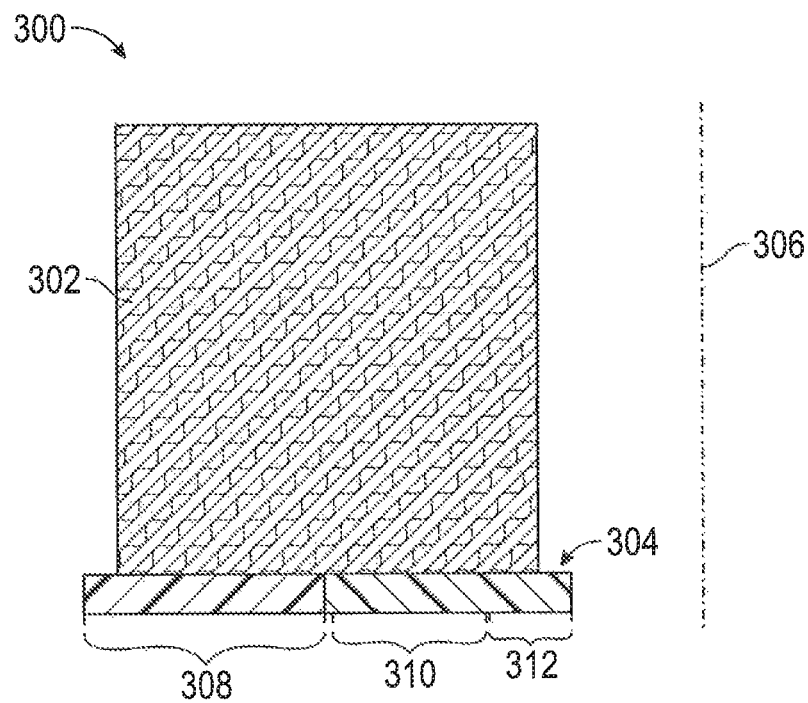
FIG. 3 is a cross-sectional view of a lower portion of another filter cartridge according to an exemplary embodiment.

Referring to FIG. 3, a cross-sectional view of a lower portion of a filter cartridge 300 is shown according to an exemplary embodiment. The filter cartridge 300 is similar to the filter cartridge 100 of FIG. 1 in both shape and arrangement. Accordingly, the filter cartridge 300 is a cylindrical filter element. The filter cartridge 300 may be a fuel filter element, an oil filter element, a hydraulic filter element, an air filter element, a water filter element or the like. The filter cartridge 300 includes a filter media 302. The filter media 302 may be a paper filter media, a foam filter media, a fibrous filter media, or the like. The filter media 302 is supported by a first endplate (not shown) and a second endplate 304. The first endplate and the second endplate 304 are secured to the filter media 302 to help support the filter media 302 and to maintain the overall shape of the filter cartridge 300. In some arrangements, the first endplate and the second endplate 304 are over molded to the filter media 302. In other arrangements, the first endplate and the second endplate 304 are secured to the filter media 302 with an adhesive. The first endplate and the second endplate 304 are made of a polyurethane material.

The first endplate and the second endplate 304 seal a clean side of the filter media 302 from the dirty side of the filter media 302. The second endplate 304 includes a central opening, the center of which is designated by center line 306. The central opening allows fluid to be filtered to enter the center of the filter cartridge 300 (e.g., in an inside-out fluid flow arrangement) or filtered fluid to leave the center of the filter cartridge 300 (e.g., in an outside-in fluid flow arrangement). As described in further detail below, the second endplate 304 is formed from a single material having a varying hardness from a harder outer portion of the second endplate 304 to a softer inner portion of the second endplate 304 (e.g., extending into the central opening).

The second endplate 304 includes a hard section 308, a gradient section 310, and a compressible section 312. The gradient section 310 is positioned between the hard section 308 and the compressible section 312. Each section 308, 310, and 312 is formed of a polyurethane. The hard section 308 has a first hardness, and the compressible section 312 has a second hardness. The first hardness is greater than the second hardness. The gradient section 310 has a variable hardness across a radial length of the gradient section 310. The variable hardness starts at the first hardness (e.g., where the gradient section 310 joins the hard section 308) and ends at the second hardness (e.g., where the gradient section 310 joins the compressible section 312). The variable hardness may vary in a linear fashion from the first hardness to the second hardness across the radial length of the gradient section 310. As the polyurethane is being poured or injected into a mold to form the second endplate 304, the mix or chemical content is varied in order to provide the variable hardness of the gradient section 310. The variable hardness of the polyurethane varies as a function of the dispensing time or the position of the dispenser within the mold for the second endplate 304 as described below with respect to FIG. 4.

Figure 4:
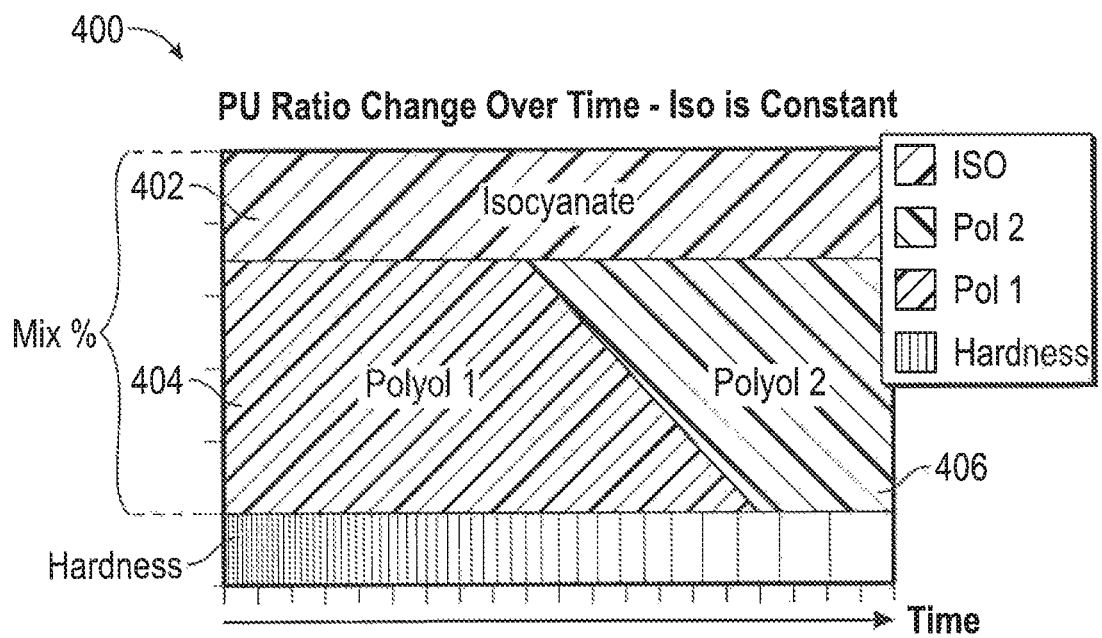
FIG. 4 is an exemplary graph showing a change in polyurethane composition of the second endplate of the filter element of FIG. 3.

Referring to FIG. 4, an exemplary graph 400 showing the change in polyurethane composition and resulting hardness when cured versus time (i.e., position of a nozzle within a mold of the second endplate 304) is shown. In some arrangements, the second endplate is comprised of a bi-component polyurethane formed of a ratio of a mix between an isocyanate and a polyol. To achieve the varying hardness of the second endplate 304, a constant mix percentage of an isocyanate 402 is used to form the polyurethane, while varying mix percentages of a first polyol 404 and a second polyol 406 are used to form the polyurethane. The varying mix percentages of the first polyol 404 and the second polyol 406 result in varying hardness of the second endplate 304 after the polyurethane has cured.

As shown in the graph 400, during the pouring or injecting operation of the liquid polyurethane into the mold of the second endplate 304, the polyurethane composition begins as the constant mix percentage of the isocyanate 402 and an initial mix percentage of the first polyol 404. None of the second polyol 406 is used in the initial part of the formation of the second endplate 304. This beginning composition of the polyurethane corresponds to the hard section 308. In other words, the hard section 408 is formed of the polyurethane having the constant mix percentage of the isocyanate 402 and a first mix percentage of the first polyol 404, wherein the constant mix percentage and the first mix percentage total one hundred percent. As the injector or pouring device reaches the gradient section 310 portion of the mold, the first polyol 404 mix percentage is reduced and the second polyol 406 mix percentage is increased from zero according to a linear equation until none of the first polyol 404 is being used. During the injecting or pouring of the gradient section 310, the mix percentage of the isocyanate 402 remains constant. As the mix percentage of the first polyol 404 is decreased and the mix percentage of the second polyol 406 is increased, the resulting polyurethane will have a decreasing hardness compared to the polyurethane of the hard section 308 after the polyurethane for each section has cured.

As the injector or pouring device reaches the compressible section 312 portion of the mold, the first polyol 404 mix percentage reaches zero and the second polyol 406 mix percentage is increased to its maximum mix percentage, while the mix percentage of the isocyanate 402 remains constant. In other words, the compressible section 312 is formed of the polyurethane having the constant mix percentage of the isocyanate 402 and a second mix percentage of the second polyol 406, wherein the constant mix percentage and the second mix percentage total one hundred percent. Accordingly, the polyurethane in the compressible section 312 is comprised of only the isocyanate 402 and the second polyol 406, which results in a less hard polyurethane than either the hard section 308 or the gradient section 310 after the polyurethane for each section has cured. Unlike second endplate 106 of filter cartridge 100, which is made from two discrete and different polyurethane materials, the second endplate 304 of filter cartridge 300 is formed from a single polyurethane having a varying composition, which results a varied hardness at different points of the second endplate 304 after the polyurethane has cured. The filter media 302 may be pressed into the second endplate 304 such that the second endplate 304 is overmolded onto the filter media 302.

Figure 5:
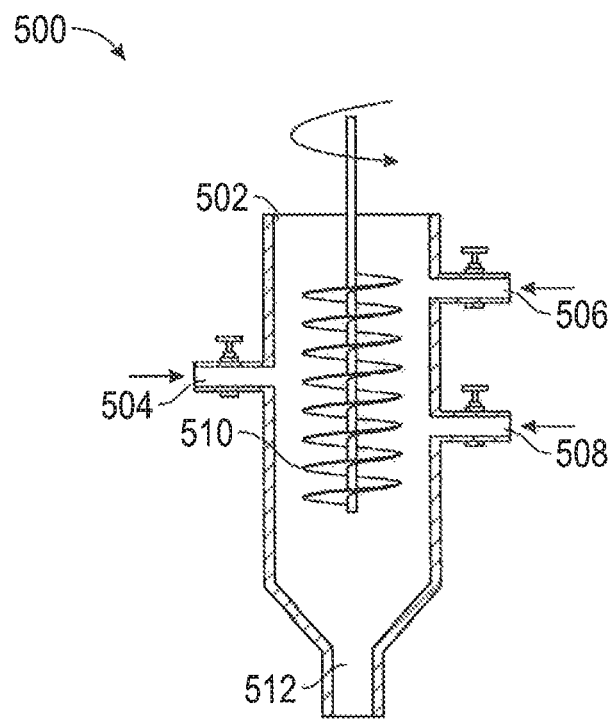
FIG. 5 is a mixing and injecting device is shown according to an exemplary embodiment.

Referring to FIG. 5, a mixing and injecting device 500 is shown according to an exemplary embodiment. The mixing and injecting device 500 is used to form the second endplate 304 in the manner described above with respect to FIGS. 3 and 4. The mixing and injecting device 500 includes a mixing chamber 502. The mixing chamber 502 has three chemical inlets: a first inlet 504, a second inlet 506, and a third inlet 508. Each inlet has an associated valve that controls the fluid flow from the associated inlet into the mixing chamber 502. The first inlet 504 provides the isocyanate 402 into the mixing chamber 502. The second inlet 506 provides the first polyol 404 into the mixing chamber 502. The third inlet 508 provides the second polyol 406 into the mixing chamber 502. An auger 510 mixes the contents of the mixing chamber 502 and forces the mixed contents out of a nozzle 512. In other arrangements, the auger is only used for mixing the contents of the mixing chamber 502, and the mixing chamber is pressurized to force the contents of the mixing chamber 502 out of the nozzle 512. The nozzle 512 is directed into the mold of the second endplate 304. The polyurethane then hardens in the mold to form the second endplate 304.

Figure 6:
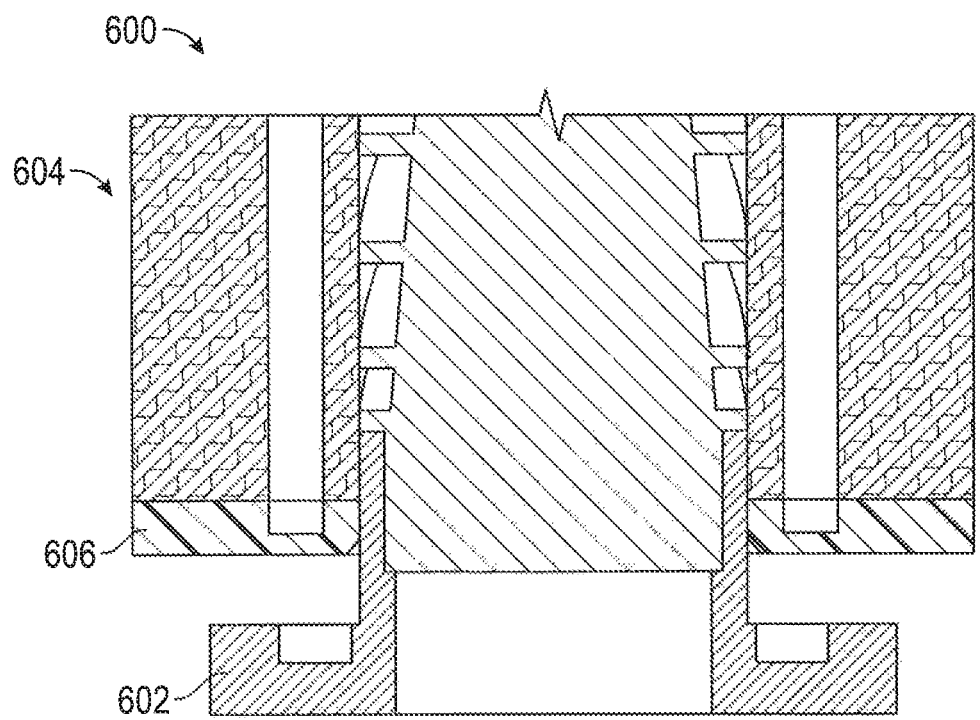
FIG. 6 is a cross-sectional view of a portion of a filtration system according to an exemplary embodiment.

Referring to FIG. 6, a cross-sectional view of a portion of a filtration system 600 is shown according to an exemplary embodiment. The filtration system includes a housing having a standpipe 602 and a filter cartridge 604 installed on the standpipe 602. The filter cartridge 604 includes a first endplate (e.g., a top endplate (not shown)) and a second endplate 606. The second endplate 606 may be formed in the same manner as described above with respect to second endplate 106 or second endplate 304. As shown in FIG. 6, a compressible portion of the second endplate 606 (e.g., the inner portion of the second endplate 606) seals against the standpipe 602 of the filtration system 600 thereby creating a seal between the second endplate 606 and the standpipe 602 when the filter cartridge 604 is installed within the housing of the filtration system 600. The seal prevents fluid leakage between the second endplate 606 and the standpipe 602. Although shown as a standpipe 602, the seal may be formed with another component of the filtration system 600, such as a surface, a central tube, or the like.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. It should be also be understood that, where the terms "approximately" and "about" are used, the identified dimensions and/or ranges are intended to cover slight variations that may result due to standard manufacturing and/or assembly tolerances as understood in the art.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method of manufacturing an endcap of a filter cartridge, the method comprising:
   creating a mold for the endcap, wherein the mold includes a first section, a second section and a third section between the first section and the second section;
   injecting a first type of polyurethane in the first section by injecting a mixture of an isocyanate at a constant mix percentage and a first polyol at a first mix percentage into the first section, wherein the constant mix percentage and the first mix percentage total one hundred percent;
   injecting a second type of polyurethane in the second section by injecting a mixture of the isocyanate at the constant mix percentage and a second polyol at a second mix percentage into the second section, wherein the constant mix percentage and the second mix percentage total one hundred percent,
   injecting a third type of polyurethane in the third section by injecting a mixture of the isocyanate at the constant mix percentage, the first polyol, and the second polyol into the third section, wherein the mix percentages of the first polyol and second polyol vary according to a linear equation from a time in which none of the second polyol is being used until none of the first polyol is being injected; and
   the first type of polyurethane injected into the first section has a first hardness when cured, the second type of polyurethane injected into the second section has a second hardness when cured, wherein the first hardness is greater than the second hardness.

2. The method of claim 1, further comprising:
   forming a tab of the first type of polyurethane,
   wherein the second type of polyurethane is overmolded on the tab after curing.

3. The method of claim 1, wherein the second type of polyurethane is a foamed polyurethane.

4. The method of claim 1, wherein the third type of polyurethane injected into the third section has a variable hardness when cured.

5. The method of claim 4, wherein the variable hardness varies from first hardness at a location where the third section meets the first section to the second hardness at a location where the third section meets the second section.

6. The method of claim 5, wherein the variable hardness varies linearly from the first hardness to the second hardness.

7. The method of claim 5, wherein the variable hardness varies as a function of dispensing time of the injected polyurethane.

8. A method of manufacturing a filter cartridge, comprising:
   providing a filter media having a first end and a second end;
   securing a first endplate to the first end of the filter media; and
   securing a second endplate to the second end of the filter media, the second endplate including a hard section and a compressible section, the hard section having a first hardness, the compressible section having a second hardness, the first hardness being greater than the second hardness, the compressible section configured to provide a sealing surface between the second endplate and a component of a filtration system when the filter cartridge is installed in the filtration system, the second endplate further including a gradient section positioned between the hard section and the compressible section, the gradient section having a variable hardness.

9. The method of claim 8, wherein the hard section is made from a first polyurethane, and the compressible section is made from a second polyurethane, wherein the first polyurethane is harder than the second polyurethane.

10. The method of claim 8, wherein the second polyurethane is a foamed polyurethane.

11. The method of claim 8, wherein the variable hardness of the gradient section varies across a radial length of the gradient section from the first hardness to the second hardness.

12. The method of claim 11, wherein the variable hardness varies in a linear fashion across the radial length of the gradient section.

13. The method of claim 11, wherein the gradient section is formed of a polyurethane having a constant mix percentage of an isocyanate and variable mix percentages of a first polyol and a second polyol.

14. The method of claim 8, wherein the second endplate includes a central opening.

15. The method of claim 14, wherein the compressible section is adjacent to the central opening.

16. The method of claim 8, wherein the second endcap is overmolded to the first end of the filter media.

17. The method of claim 16, wherein the first endcap is overmolded to the second end of the filter media.

18. The method of claim 8, wherein the second endcap is secured to the first end of the filter media via adhesive.

19. The method of claim 18, wherein the first endcap is secured to the first end of the filter media via adhesive.

20. A method of manufacturing an endcap of a filter cartridge, the method comprising:
   creating a mold for the endcap, wherein the mold includes a first section, a second section and a third section;
   injecting a first type of polyurethane into the first section, a second type of polyurethane in the second section, and a third type of polyurethane in the third section of the mold to form the endcap,
   wherein the first type of polyurethane injected into the first section has a first hardness when cured, the second type of polyurethane injected into the second section has a second hardness when cured, wherein the first hardness is greater than the second hardness, and wherein the third type of polyurethane injected into the third section has a variable hardness when cured.

* * * * *